US011181083B2

(12) United States Patent
Vite Cadena (10) Patent No.: US 11,181,083 B2
(45) Date of Patent: Nov. 23, 2021

(54) SNORKEL INSTALLATION KIT

(71) Applicant: NISSAN NORTH AMERICA, INC., Franklin, TN (US)

(72) Inventor: Manuel Alejandro Vite Cadena, Farmington Hills, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 39 days.

(21) Appl. No.: 16/721,155

(22) Filed: Dec. 19, 2019

(65) Prior Publication Data

US 2021/0190019 A1  Jun. 24, 2021

(51) Int. Cl.
*F02M 35/10* (2006.01)
*F02M 35/16* (2006.01)
*B60K 13/02* (2006.01)

(52) U.S. Cl.
CPC .......... *F02M 35/10144* (2013.01); *F02M 35/10006* (2013.01); *F02M 35/10104* (2013.01); *F02M 35/10124* (2013.01); *F02M 35/16* (2013.01); *B60K 13/02* (2013.01)

(58) Field of Classification Search
CPC ........ B60K 13/00; B60K 13/02; B60K 13/06; F02M 35/10354; F02M 35/161; F02M 35/10144
See application file for complete search history.

(56) References Cited

U.S. PATENT DOCUMENTS

| 2,601,172 | A | * | 6/1952 | Sebok | F02M 35/14 |
| | | | | | 55/507 |
| 4,926,813 | A | * | 5/1990 | Bonde | F02B 63/02 |
| | | | | | 123/184.21 |
| 6,401,679 | B1 | * | 6/2002 | Self | F02M 35/10052 |
| | | | | | 123/184.31 |
| 7,562,739 | B2 | | 7/2009 | Lan et al. | |
| 8,789,633 | B2 | | 7/2014 | Yamaguchi et al. | |
| 8,960,347 | B2 | | 2/2015 | Bennett | |
| 9,475,380 | B2 | | 10/2016 | Matsubara | |
| 10,060,395 | B2 | | 8/2018 | Somerville | |
| 10,393,076 | B1 | * | 8/2019 | Freeman | B60K 13/02 |
| 10,428,773 | B1 | | 10/2019 | Bennett et al. | |
| 10,752,106 | B1 | * | 8/2020 | Freeman | F02M 35/10144 |
| 2002/0148427 | A1 | * | 10/2002 | Jones | B29C 66/54 |
| | | | | | 123/184.61 |

(Continued)

FOREIGN PATENT DOCUMENTS

| DE | 2050619 A1 * | 4/1972 | ............. F02M 19/00 |
| DE | 3118064 A1 * | 11/1982 | ....... F02M 35/10321 |

(Continued)

OTHER PUBLICATIONS

Abstract DE102018109710A1 English Machine Translation Provided by ESPACENET (Year: 2021).*

(Continued)

*Primary Examiner* — Michael A Kessler
(74) *Attorney, Agent, or Firm* — Global IP Counselors, LLP (57) ABSTRACT

A snorkel installation kit includes a fender pipe and a snorkel. The fender pipe has an air intake. The snorkel has a protrusion defining an outlet that is received by the air intake of the fender pipe. The fender pipe and the snorkel are separated by a space when installed to each other.

18 Claims, 5 Drawing Sheets

(56) References Cited

U.S. PATENT DOCUMENTS

| | | | |
|---|---|---|---|
| 2009/0064960 A1* | 3/2009 | Masujima | F02M 35/10321 |
| | | | 123/184.61 |
| 2014/0360794 A1 | 12/2014 | Tallman | |
| 2018/0319270 A1* | 11/2018 | Tier | B60K 13/02 |
| 2020/0198746 A1* | 6/2020 | Nakayama | B63H 20/001 |

FOREIGN PATENT DOCUMENTS

| | | | | |
|---|---|---|---|---|
| DE | 10017449 A1 | * | 10/2001 | F02M 35/10347 |
| DE | 102018109710 A1 | * | 10/2019 | F02M 35/10013 |
| JP | 2003286914 A | * | 10/2003 | F02M 35/10321 |

OTHER PUBLICATIONS

Description DE102018109710A1 English Machine Translation Provided by ESPACENET (Year: 2021).*

Description DE10017449A1 English Machine Translation Provided by ESPACENET (Year: 2021).*

I Like to Make Stuff, "Installing a snorkel on a Land Cruiser (FJ80) // How-To", https://www.youtube.com/watch?v=PJDpvSBJ1Zs, at least by Dec. 2019.

Service My Ride, "How To Install a Snorkel", https://www.youtube.com/watch?v=A-2ZsiTIF3A, at least by Dec. 2019.

\* cited by examiner

SNORKEL INSTALLATION KIT

BACKGROUND

Field of the Invention

The present invention generally relates to a snorkel installation kit for a vehicle. More specifically, the present invention relates to a snorkel installation kit having a snorkel.

Background Information

Vehicles, particularly off-road vehicles, can be equipped with a snorkel as an aftermarket accessory. The snorkel is typically a plastic tubing routed out through one of the front fenders and is connected to the internal filtration system of the vehicle. Vehicle snorkels are connected to a fender pipe that is disposed in the engine compartment of the vehicle and is connected to the internal filtration system. In this way, the snorkel is connect to the internal filtration system.

SUMMARY

In view of the state of the known technology, one aspect of the present disclosure is to provide a snorkel installation kit comprising a fender pipe and a snorkel. The fender pipe has an air intake. The snorkel has a protrusion defining an outlet that is received by the air intake of the fender pipe. The fender pipe and the snorkel are separated by a space when installed to each other.

In view of the state of the known technology, another aspect of the present disclosure is to provide a vehicle snorkel comprising a first end, a second end and an elongated body. The first end has an air inlet. The second end has a vehicle attachment surface, an air outlet and a recessed surface. The vehicle attachment surface is configured to contact a vehicle fender when the vehicle snorkel is installed to the vehicle fender. The air outlet is defined by a protrusion extending with respect to the vehicle attachment surface. The recessed surface connects the protrusion and the vehicle attachment surface. The recessed surface has a sealant receiving opening for receiving sealant that is to be applied to the recessed surface. The elongated body extends between and connecting the first and second ends.

In view of the state of the known technology, another aspect of the present disclosure is to provide a vehicle comprising a vehicle fender, a fender pipe, a snorkel and a space. The vehicle fender has an exterior facing side and an interior facing side. The fender pipe is supported on the interior facing side of the vehicle fender. The snorkel is supported on the exterior facing side of the vehicle fender. The space extends across the interior facing side and the exterior facing side of the vehicle fender. The space has a portion of the vehicle fender disposed therein.

Also other objects, features, aspects and advantages of the disclosed a snorkel installation kit will become apparent to those skilled in the art from the following detailed description, which, taken in conjunction with the annexed drawings, discloses one embodiment of the vehicle snorkel installation kit.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
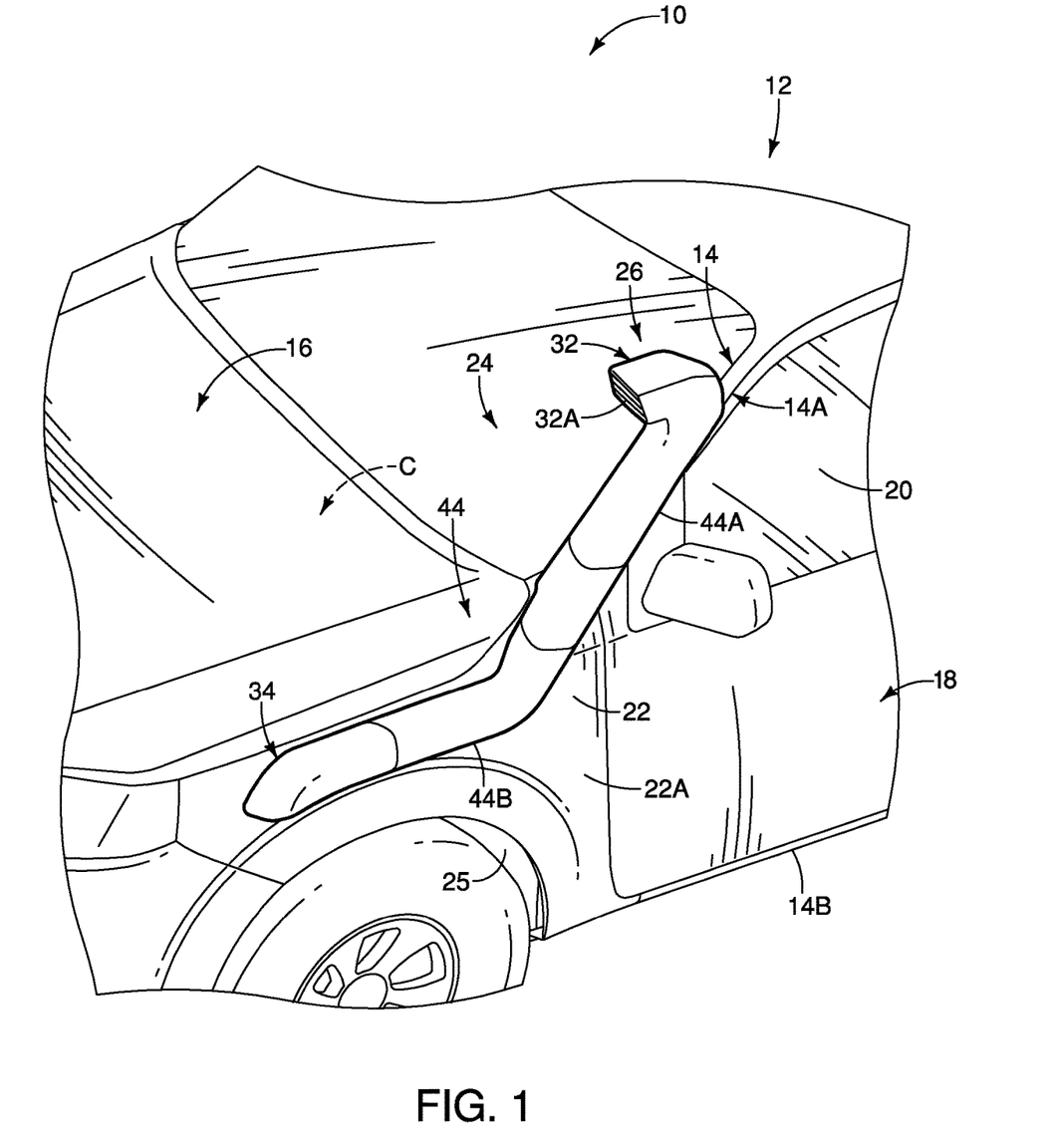
FIG. 1 is a front perspective view of a vehicle equipped with a vehicle snorkel installation kit in accordance with an illustrated embodiment.

Referring initially to FIG. 1, a portion of a vehicle 10 is illustrated in accordance with an embodiment. The vehicle 10 is shown including a vehicle body 12 having a front pillar 14 and a vehicle hood 16 supported to the front pillar 14. The front pillar 14 has an upper pillar 14A (i.e., A-pillar) and a lower pillar 14B that together support a vehicle door 18 for the vehicle 10. The vehicle 10 further includes an identical corresponding front pillar that is installed onto the other side of the vehicle 10. The upper pillar 14A further supports a door window pane 20 and defines a portion of the roof sides of the vehicle 10. The vehicle 10 further comprises a vehicle fender 22 that is supported to the upper pillar 14A and the vehicle hood 16. The vehicle fender 22 is supported against the upper pillar 14A. The fender 22 is made of sheet metal and frames a wheel well 25 of the vehicle 10. In particular, the vehicle fender 22 at least partially defines an interior compartment C (e.g., engine compartment) of the vehicle 10 and partially defines the vehicle's 10 exterior. The vehicle fender 22 has an exterior facing side 22A and an interior facing side 22B. The exterior facing side 22A faces away from the vehicle 10 and towards the vehicle exterior environment. The interior facing side 22B faces the interior compartment C.

The vehicle 10 of the illustrated embodiment is equipped with a snorkel installation kit 24. Thus, in the illustrated embodiment, the vehicle 10 further comprises a snorkel 26 that is installed to the vehicle body 12, as will be further discussed below. The snorkel installation kit 24 further includes a fender pipe 28 disposed in the interior compartment C of the vehicle 10, as will be further discussed below.

The interior compartment C of the vehicle 10 houses the vehicle's 10 engine (not shown) and an air filtration system 30 for the vehicle 10 that filters out particles and contaminants due to the vehicle's 10 air intake during use. In particular, the vehicle 10 can include a combustion engine that needs air and fuel to operate. The more air and oxygen flow into the intake manifold, the more efficient the engine's combustion. Typically, the air filtration system 30 includes a filter housing that houses an air filter (not shown), and an air conduit (not shown) that is in communication with a throttle body of the engine. The fender pipe 28 is disposed in the interior compartment C and can be considered part of the air filtration system 30. Therefore, the fender pipe 28 is supported on the interior facing side 22B of the vehicle fender 22, as best seen in FIGS. 3, 5, 6 and 7.

The vehicle 10 of the illustrated embodiment can be an off-road type vehicle that can be designed and equipped to travel through bodies of water. Therefore, the vehicle 10 is equipped with the snorkel 26 that is installed to the vehicle's 10 exterior. The snorkel 26 enables air intake through the snorkel 26 to reduce water intake into the interior compartment C when crossing bodies of water, such as lakes or flooded areas. The snorkel 26 also enables access to cleaner and cooler air for the engine in order to reduce engine wear and tear over time, and to improve engine performance.

Figure 3:
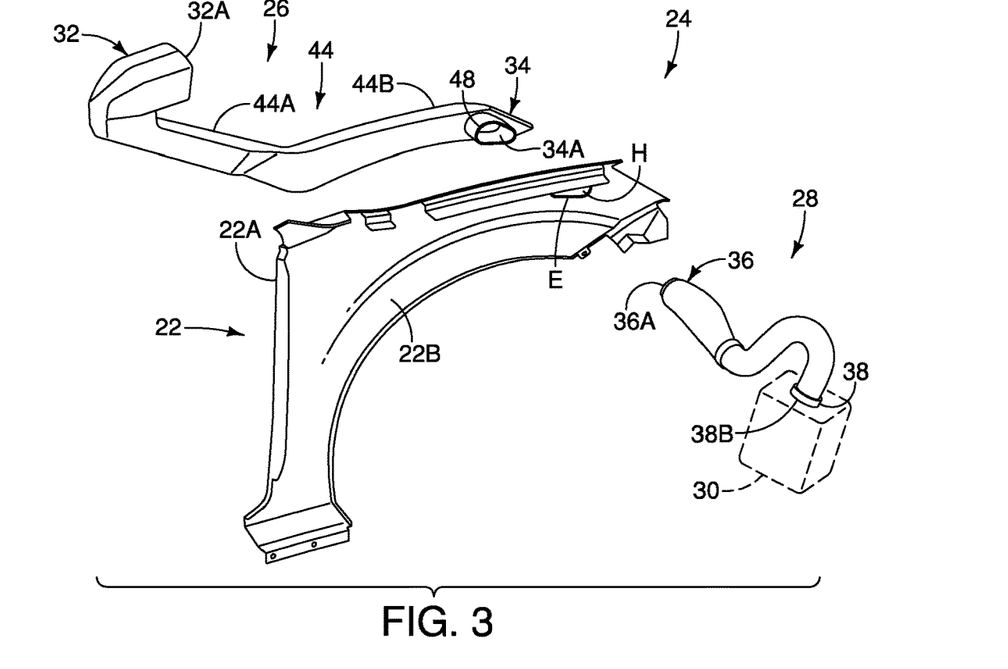
FIG. 3 is an exploded view of the snorkel installation kit from an interior facing surface of the vehicle's fender.

As best seen in FIG. 3, the snorkel 26 includes a first end 32 and a second end 34. The first end 32 includes an air inlet 32A for intaking air from the external environment, and the second end 34 includes an air outlet 34B for dispelling the air to the fender pipe 28. Snorkels are typically sold as after-market accessories which requires installation by the dealer, mechanic or a vehicle owner. In order to install the snorkel 26, a user needs to cut or drill a hole H (best seen in FIG. 5) in the fender 22 and insert a portion of the snorkel 26 therethrough. The snorkel 26 is thus supported to the fender 22 via the hole H that is created in the fender 22. The hole H is sized and shaped to correspond to a size and shape of the outlet 34A of the snorkel 26 body in order to fittedly receive the outlet 34A through the hole H. That is, the snorkel 26 is installed through the hole H of the fender 22 so that the outlet 34A of the snorkel 26 extends into the interior compartment C.

The outlet 34A of the snorkel 26 is then fittedly received by the fender pipe 28 inside the interior compartment C so that the snorkel 26 can intake air from the external environment, and transfer the air to the fender pipe 28. That is, the snorkel 26 is sized and dimensioned for a snug fit through the hole H of the fender pipe 28. The snorkel 26 and the fender pipe 28 are also preferably sized and dimensioned for a snug fit when the two components are joined, as will be further discussed below. In this way, air taken in by the snorkel 26 can be filtered by the air filtration system 30 inside the interior compartment C.

Because drilling the hole H in the fender 22 is required in order to install the snorkel 26, the edges E of the hole H and the immediate surrounding portions are more susceptible to corrosion and wear and tear over time. In the illustrated embodiment, the term "edges" can refer to one or more separate portions of the rim or edge of the hole H and/or the entirety of the rim or edge of the hole H. That is, the exposed sheet metal edges E of the hole H of the fender 22 are more susceptible to corrosion. Therefore, it is desirable to apply an anti-corrosive sealant S (shown in FIG. 7) to the area where the hole H is created. In the illustrated embodiment, the snorkel 26 and the fender pipe 28 are joined in such a way to form a reservoir R therebetween. The reservoir R receives the edges E of the hole H therethough once the installation of the snorkel 26 is complete. Sealant S is applied to the reservoir R so that the edges E of the hole H are encapsulated in the reservoir R with the sealant S. The sealant S can be moisture cured polyurethane sealant S/adhesive or sensor safe silicone adhesive.

Figure 4:
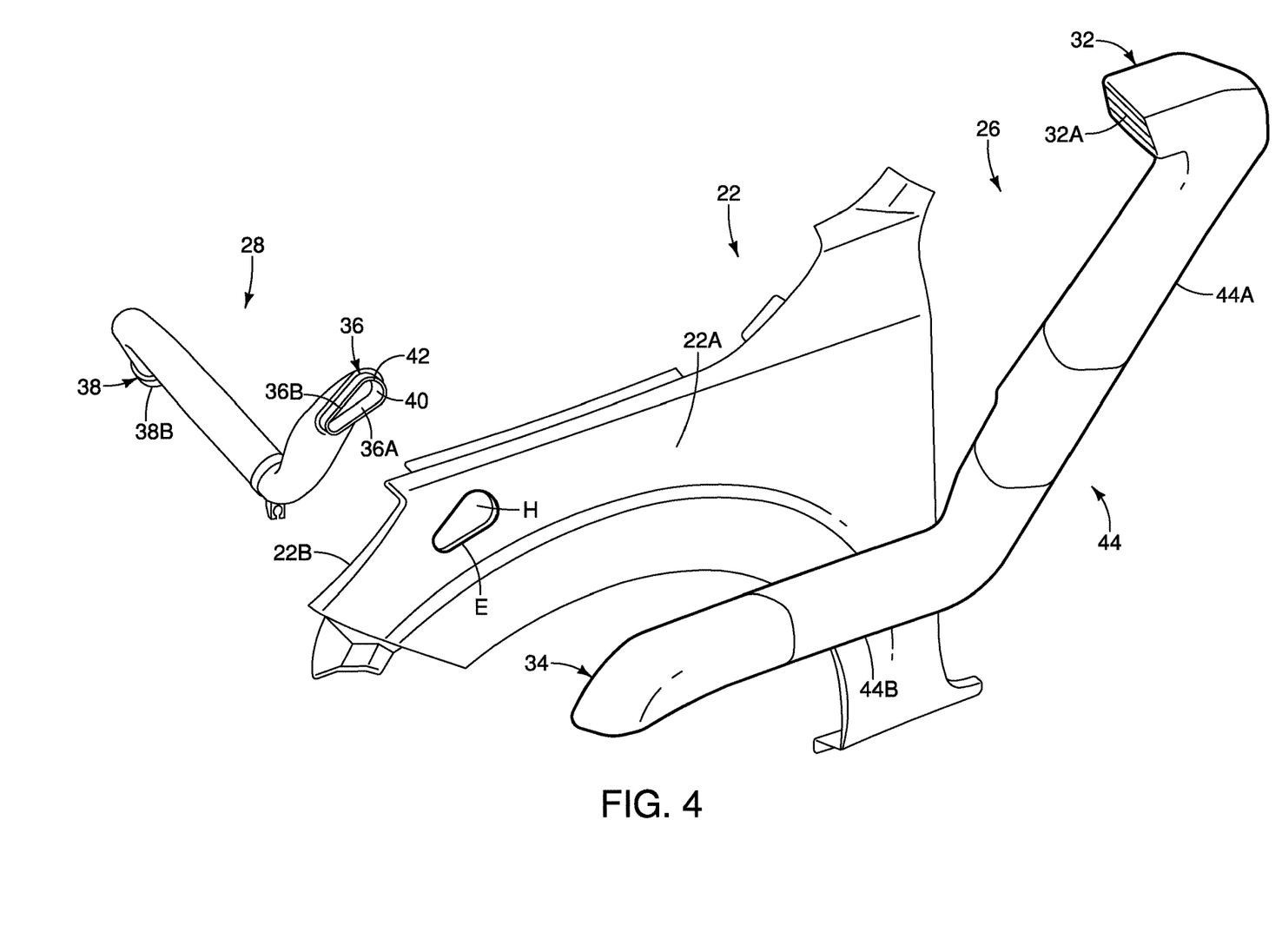
FIG. 4 is an exploded view of the snorkel installation kit from an exterior facing surface of the vehicle's fender.

The fender pipe 28 is a conduit between the air filter housing and the snorkel 26 to transport air to the engine. Referring to FIGS. 3 and 4, the fender pipe 28 has a first end 36 with an air intake 36A and a second end 38 with an air outlet 38B. The air intake 36A is fixed to the outlet 34A of the snorkel 26 in order to receive air from the snorkel 26. The air outlet 38B of the fender pipe 28 communicates with a filter housing of the air filtration system 30 such that air drawn in through the air intake 36A enters and passes through an internal filter within the air filtration system 30. In this way, filtered air is drawn into the engine through from the fender pipe 28.

Figure 6:
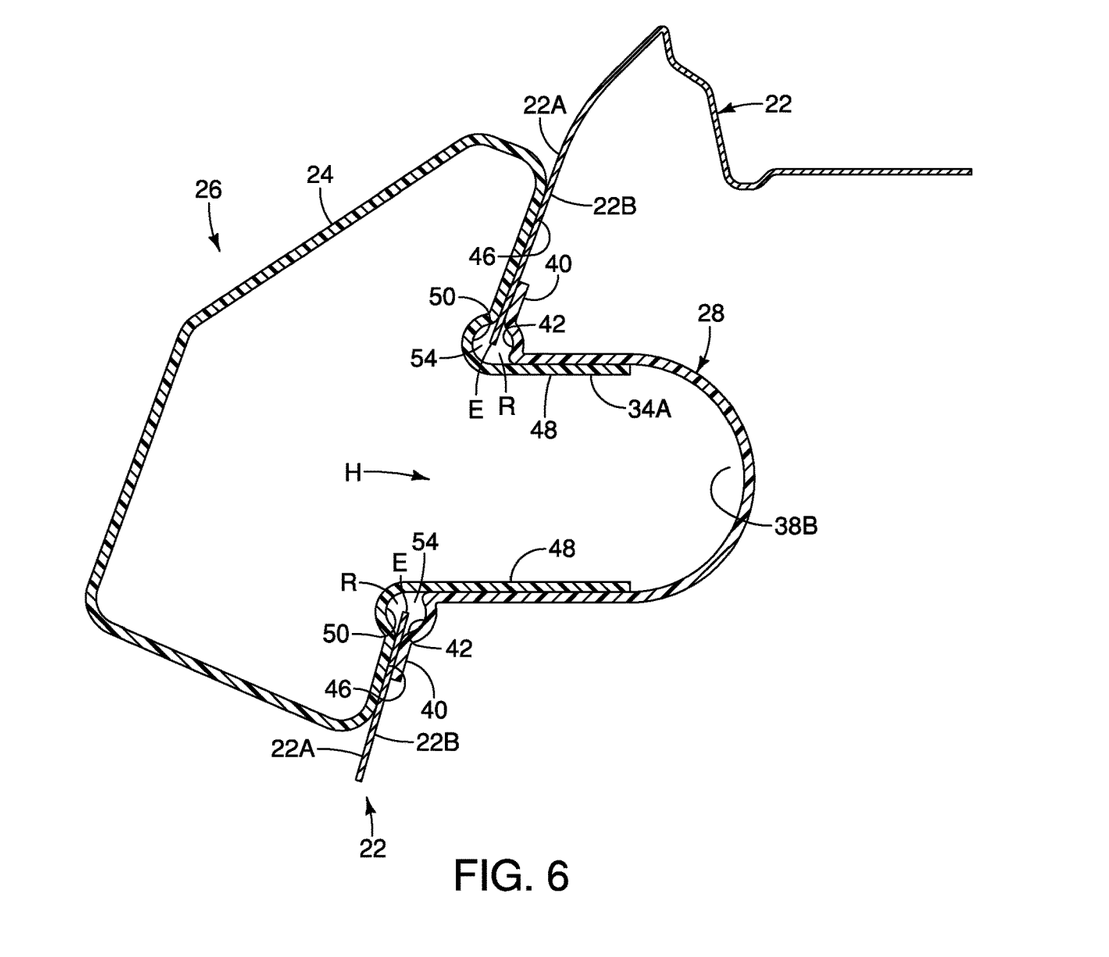
FIG. 6 is a cross-sectional view of a connection formed between the snorkel, a fender pipe and the fender.
Figure 7:
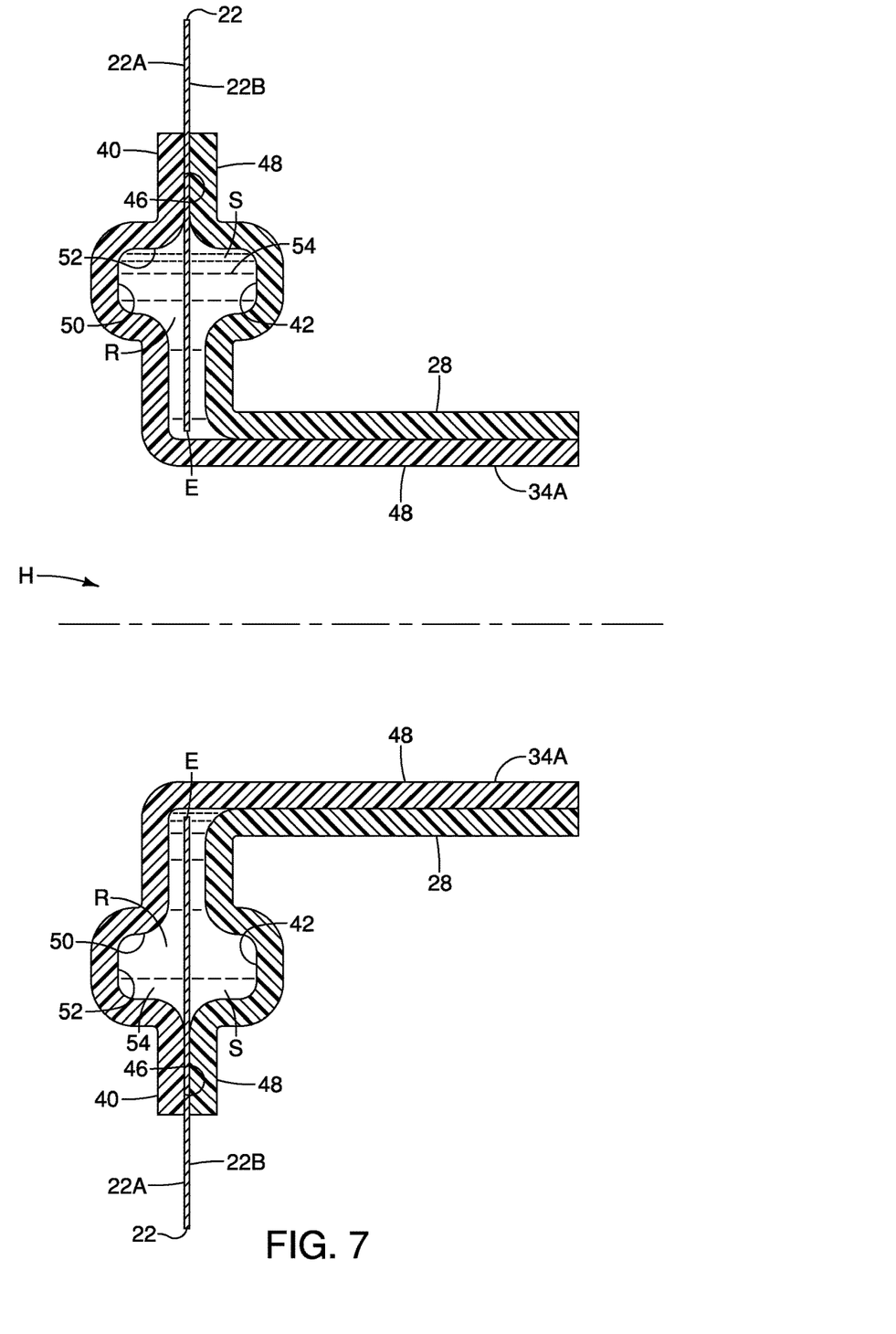
FIG. 7 is an enlarged cross-sectional view of the connection of FIG. 6.

As best seen in FIGS. 4, 6 and 7, the air intake 36A of the fender pipe 28 includes an opening 36B that is disposed at the first end 36 that receives air from the snorkel 26. The first end 36 includes an outwardly protruding flange 40 that extends from the opening 36B. The flange 40 substantially contacts the interior facing side 22B of the fender 22 when installed to the fender 22. The flange 40 further includes a recessed surface 42 that extends around an outer perimeter of the opening 36B of the air intake 36A. The recessed surface 42 is a groove that extends in a direction away from the interior facing side 22B of the fender 22. The recessed surface 42 does not contact the interior facing side 22B of the fender 22. Alternatively speaking, the recessed surface 42 is spaced from the fender 22. The recessed surface 42 partially forms the reservoir R that will store the sealant S. As will be further discussed below, the edges E of the hole H of the fender 22 will be received towards the recessed surface 42 of the fender pipe 28. While the recessed surface 42 of the fender pipe 28 is illustrated as being a curved surface, it will be apparent to those skilled in the vehicle field from this disclosure that the recessed surface 42 can have different shapes as needed and/or desired.

Therefore, in the illustrated embodiment, the snorkel 26 and the fender pipe 28 are provided to improve the protection of the anti-corrosive sealant S in order to prolong the application of the sealant S to the exposed surfaces of the hole H. Preferably, during the installation process, the sealant S is applied to the snorkel 26 and the edges E of the hole H of the fender 22 once the snorkel 26 is installed through the hole H. When the snorkel 26 and the fender pipe 28 are joined, the fender pipe 28 encapsulates the reservoir R with the exposed edges E of the hole H sealed therein.

The snorkel 26 of the illustrated embodiment can be available as part of the snorkel installation kit 24. Therefore, in the illustrated embodiment, the snorkel installation kit 24 is illustrated as including at least the snorkel 26. Preferably, the snorkel installation kit 24 further includes the fender pipe 28. Preferably, the snorkel installation kit 24 further includes the sealant S that is used to be applied into the reservoir R. The reservoir R formed by the connection between the snorkel 26 and the fender pipe 28 will be further discussed below.

Figure 2:
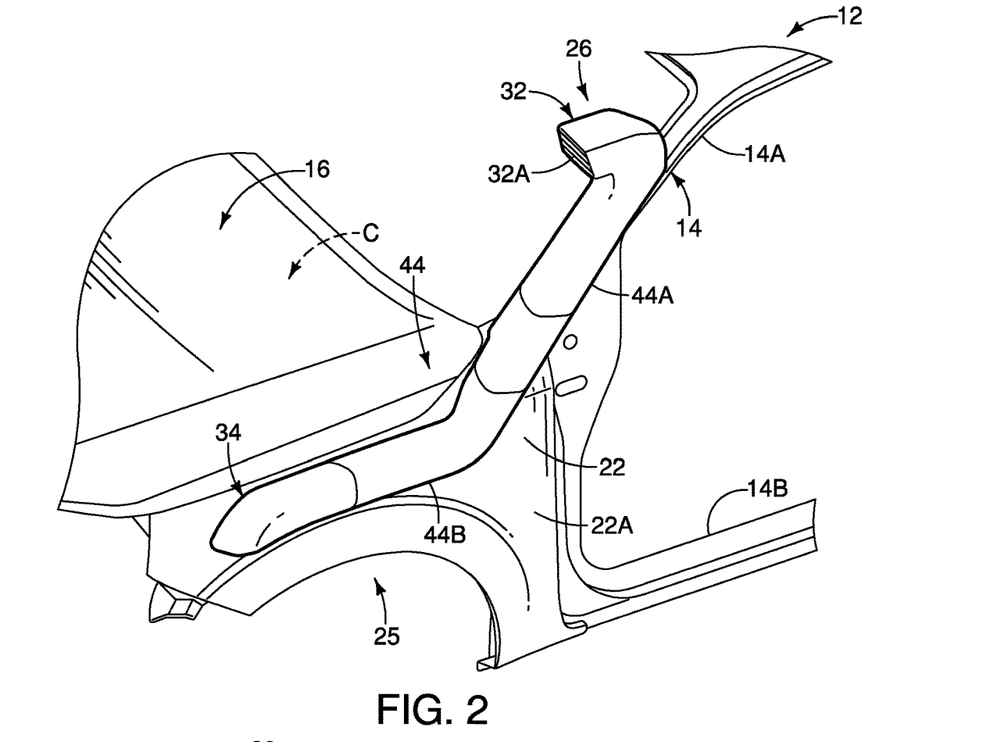
FIG. 2 is another front perspective view of the vehicle similar to FIG. 1 with selected portions removed to better show the snorkel installation kit.
Figure 5:
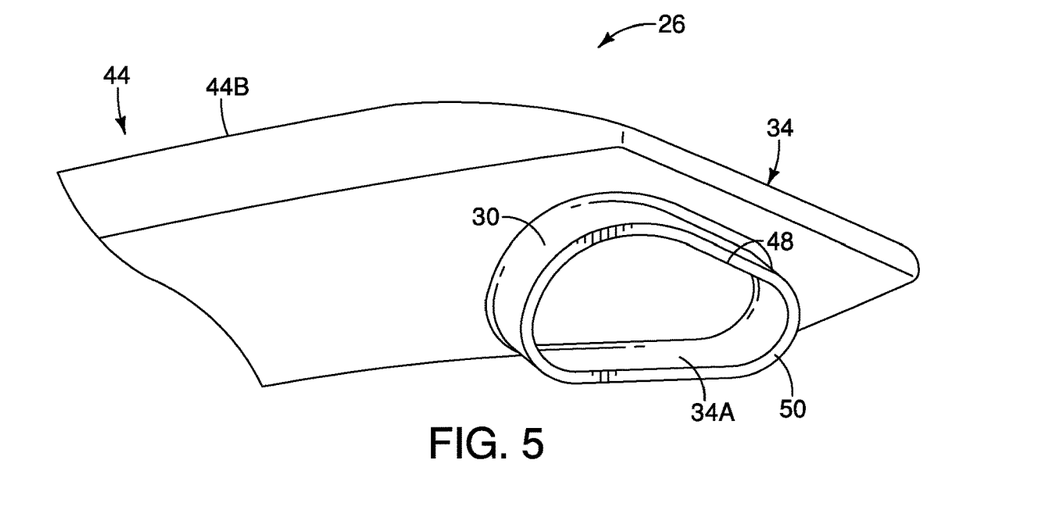
FIG. 5 is an enlarged view of an outlet of the snorkel of the snorkel installation kit.

Referring to FIGS. 2, 5 and 6, the snorkel 26 is supported to the exterior facing side 22A of the vehicle fender 22. As previously stated, the snorkel 26 is installed to the vehicle's 10 exterior. The snorkel 26 is a rigid member that is formed of molded plastic. In particular, the snorkel 26 can be a plastic tubing. As stated, the snorkel 26 includes the first end 32 having the inlet 32A and the second end 34 having the outlet 34A. The snorkel 26 further includes an elongated body 44 extending between and connecting the first and second ends 32 and 34. Therefore, the elongated body 44 connects the inlet 32A and the outlet 34A. The elongated body 44 is disposed on the exterior facing side 22A of the vehicle fender 22.

In particular, the elongated body 44 includes a snorkel extender 44A that is installed to the upper pillar 14A by a bracket (not shown). The snorkel extender 44A is aligned with the upper pillar 14A and includes the air inlet 32A of the snorkel 26. The snorkel extender 44A enables the air inlet 32A to be mounted high on the vehicle 10. Such a configuration is particularly useful when the vehicle 10 is off-roading in dusty dry environments such as deserts where traveling on the terrain raises dust clouds. As the air inlet 32A is mounted high on the vehicle 10 and is located generally at the roof line of the vehicle 10, air drawn into the inlet 32A tends to be significantly less dusty than air drawn in at a lower position. The air inlet 32A can include an air ram that causes air entering the snorkel 26 to swirl, creating a cyclonic effect. This causes the heaviest particles to be ejected by the centrifugal force to the periphery of the swirl and can be ejected from slots (not shown) disposed about the snorkel 26. The elongated body 44 further includes an air tube 44B extending at an angle with respect to the snorkel extender 44A. The air tube 44B includes the second end 34 and the outlet 34A of the snorkel 26. The air tube 44B is fixed to the fender 22 via the hole H of the fender 22.

Referring to FIGS. 3, 4 and 6, the second end 34 of the snorkel 26 has a vehicle attachment surface 46 that is configured to contact the vehicle fender 22 when the vehicle snorkel 26 is installed to the vehicle fender 22. As stated, the second end 34 includes the air outlet 34A that is to be disposed through the hole H of the fender 22 and received by the fender pipe 28. In the illustrated embodiment, as best shown in FIGS. 4 and 6, the outlet 34A is defined by a protrusion 48 extending away from the vehicle attachment surface 46. The protrusion 48 can be considered a rim of the outlet 34A. The protrusion 48 is sized and dimensioned to substantially correspond to the size and dimension of the hole H of the fender 22. The protrusion 48 extends with respect to the vehicle attachment surface 46 and extends from the elongated body 44. Therefore, the protrusion 48 extends in a direction towards the vehicle body 12 and into the interior compartment C when the snorkel 26 is installed to the fender 22.

As seen in FIG. 6, the protrusion 48 is configured to be received by the vehicle fender pipe 28 when the vehicle snorkel 26 is installed to the vehicle fender 22. In this way, the protrusion 48 extends through the hole H of the vehicle fender 22 in order to attach the snorkel 26 to the fender 22. The vehicle attachment surface 46 contacts the exterior surface of the vehicle fender 22 when the vehicle snorkel 26 is installed to the vehicle fender 22. That is, the vehicle attachment surface 46 contacts the exterior facing side 22A of the fender 22. Thus, the outlet 34A of the snorkel 26 is received through the hole H of the vehicle fender 22 and connected to the fender pipe 28. The protrusion 48 is sized and dimensioned to substantially correspond to the size and dimension of the air intake of the fender pipe 28 for a snug fit with the fender pipe 28. The snorkel 26 and the fender pipe 28 can be fixed to each other by snap-fit connection or by interference fit. Alternatively, the snorkel 26 and the fender pipe 28 can be attached using mounting studs, screws, washers, clips, brackets and other necessary hardware for convenient installation.

The outlet 34A of the snorkel 26 dispels air taken by the air inlet 32A to the fender pipe 28. As seen in FIG. 6, the outlet 34A is disposed on the interior facing side 22B of the fender 22 once the snorkel 26 is installed to the fender 22. The second end 34A of the snorkel 26 further includes a recessed surface 50 extending between and connecting the protrusion 48 and the vehicle attachment surface 46. The recessed surface 50 is disposed between the outlet 34A and the elongated body 44. As seen in FIG. 5, the recessed surface 50 preferably extends around an outer perimeter of the protrusion 48. The recessed surface 50 is preferably a groove extending around the outer perimeter of the protrusion 48. However, it will be apparent to those skilled in the vehicle field from this disclosure that the recessed surface 50 can extend partially around the outer perimeter of the protrusion 48.

As shown in FIGS. 6 and 7, the groove formed by the recessed surface 50 is curved in a direction away from the protrusion 48 that defines the outlet 34A. However, it will be apparent to those skilled in the vehicle field from this disclosure that the recessed surface 50 can have alternative shapes, as needed and/or desired. The recessed surface 50 has a sealant receiving opening 52 for receiving sealant S that is to be applied to the recessed surface 50. The sealant receiving opening 52 of the recessed surface 50 receives a portion of the vehicle fender 22 when the vehicle snorkel 26 is installed to the vehicle fender 22. In particular, the sealant receiving opening 52 receives the edges E of the hole H of the fender 22. Thus, the recessed surface 50 receives the portion of the vehicle fender 22 when the snorkel 26 is attached to the fender 22.

When the snorkel 26 is attached to the fender 22 and the fender pipe 28, the recessed surface 50 of the snorkel 26 and the recessed surface 50 of the fender pipe 28 will align to form a space 54 therebetween. That is, the recessed surface 50 of the snorkel 26 and the recessed surface 42 of the fender pipe 28 will align to form the reservoir R that receives the edges E of the fender 22 and stores the applied sealant S. Therefore, the vehicle 10 further comprises the space 54 formed by connection between the snorkel 26 and the fender pipe 28. As seen in FIGS. 6 and 7, the space 54 extends across the interior facing side 22B and the exterior facing side 22A of the vehicle fender 22. The space 54 receives the edges E of the hole H of the vehicle fender 22. Therefore, the space 54 has a portion of the vehicle fender 22 disposed therein. The edges E of the hole H of the vehicle fender 22 is disposed in the space 54 that is defined by a connection between the fender pipe 28 and the snorkel 26. Preferably, the space 54 is disposed circumferentially around the hole H to receive the entirety of the edge of the hole H. However, it will be apparent to those skilled in the vehicle field from this disclosure that the space 54 can extend partially around the hole H. Therefore, the space 54 is sized large enough to receive and store the edges E of the hole H. In this way, the edges E of the hole H of the vehicle fender 22 is encapsulated in the space 54 with the sealant S by the vehicle fender 22 and the fender pipe 28.

GENERAL INTERPRETATION OF TERMS

In understanding the scope of the present invention, the term "comprising" and its derivatives, as used herein, are intended to be open ended terms that specify the presence of the stated features, elements and/or components, but do not exclude the presence of other unstated features, elements and/or components. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle snorkel installation kit. Accordingly, these terms, as utilized to describe the present invention should be interpreted relative to a vehicle equipped with the vehicle snorkel installation kit.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle snorkel comprising:
    a first end having an air inlet;
    a second end having
        a vehicle attachment surface configured to contact a vehicle fender when the vehicle snorkel is installed to the vehicle fender,
        an air outlet that is defined by a protrusion extending with respect to the vehicle attachment surface, the protrusion being spaced from an edge of the vehicle fender when the vehicle snorkel is installed to the vehicle fender, and
        a recessed surface connecting the protrusion and the vehicle attachment surface, the recessed surface having a sealant receiving opening for receiving a sealant that is to be applied to the recessed surface; and
    an elongated body extending between and connecting the first and second ends.
2. The vehicle snorkel according to claim 1, wherein the sealant receiving opening of the recessed surface receives a portion of the vehicle fender when the vehicle snorkel is installed to the vehicle fender.
3. The vehicle snorkel according to claim 1, wherein the recessed surface is a groove extending around an outer perimeter of the protrusion.
4. The vehicle snorkel according to claim 3, wherein the groove is curved in a direction away from the protrusion.
5. The vehicle snorkel according to claim 1, wherein the protrusion extends through a hole of the vehicle fender and the vehicle attachment surface contacts an exterior of the vehicle fender when the vehicle snorkel is installed to the vehicle fender.
6. The vehicle snorkel according to claim 5, wherein the protrusion is configured to be received by a vehicle fender pipe when the vehicle snorkel is installed to the vehicle fender.
7. A vehicle snorkel installation kit comprising the vehicle snorkel according to claim 1, further comprising the sealant that is configured to be applied to the recessed surface.
8. A snorkel installation kit comprising:
    a fender pipe having an air intake, the fender pipe being configured to contact a vehicle fender when the fender pipe is installed to the vehicle fender; and
    a snorkel configured to contact the vehicle fender when the snorkel is installed to the vehicle fender, the snorkel having a protrusion defining an outlet that is received by the air intake of the fender pipe, the protrusion being spaced from an edge of the vehicle fender when the vehicle snorkel is installed to the vehicle fender, the fender pipe and the snorkel being separated by a space when installed to each other.
9. The snorkel installation kit according to claim 8, further comprising a sealant that is configured to be applied to the space.
10. A vehicle comprising a vehicle fender having an exterior facing side and an interior facing side;
    a fender pipe supported on the interior facing side of the vehicle fender;
    a snorkel supported on the exterior facing side of the vehicle fender, the snorkel being spaced from an edge of the vehicle fender; and
    a space extending across the interior facing side and the exterior facing side of the vehicle fender, the space having a portion of the vehicle fender disposed therein.
11. The vehicle according to claim 10, wherein the portion of the vehicle fender being encapsulated in the space by the snorkel and the fender pipe.
12. The vehicle according to claim 10, wherein the snorkel includes an outlet for dispelling air to the fender pipe, the outlet being disposed on the interior facing side of the vehicle fender.
13. The vehicle according to claim 12, wherein the snorkel includes an air inlet for intaking air from the vehicle's exterior, and an elongated body connecting the air inlet and the outlet, the elongated body being disposed on the exterior facing side of the vehicle fender.
14. The vehicle according to claim 13, wherein the snorkel includes a recessed surface disposed between the outlet and the elongated body, the recessed surface defining the space that receives the portion of the vehicle fender.
15. The vehicle according to claim 13, wherein the outlet of the snorkel is formed by a protrusion extending from the elongated body.
16. The vehicle according to claim 15, wherein the snorkel further includes a recessed surface extending around an outer perimeter of the protrusion, the recessed surface receiving the portion of the vehicle fender.
17. A vehicle snorkel installation kit comprising the vehicle according to claim 16, further comprising a sealant that is applied to the recessed surface of the snorkel.
18. A vehicle snorkel installation kit comprising the vehicle according to claim 10, further comprising a sealant that is configured to be stored in the space.

* * * * *